US011534690B2

(12) United States Patent
Wu et al.

(10) Patent No.: US 11,534,690 B2
(45) Date of Patent: Dec. 27, 2022

(54) READABLE AND EDITABLE NPC BEHAVIOR CREATION USING REINFORCEMENT LEARNING

(71) Applicant: Electronic Arts Inc., Redwood City, CA (US)

(72) Inventors: Meng Wu, Sunnyvale, CA (US);
Harold Chaput, Belmont, CA (US);
Navid Aghdaie, San Jose, CA (US);
Kazi Zaman, Foster City, CA (US);
Yunqi Zhao, Santa Clara, CA (US);
Qilian Yu, San Mateo, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 127 days.

(21) Appl. No.: 16/999,444

(22) Filed: Aug. 21, 2020

(65) Prior Publication Data
US 2022/0054943 A1 Feb. 24, 2022

(51) Int. Cl.
*A63F 13/57* (2014.01)
*G06N 20/00* (2019.01)

(52) U.S. Cl.
CPC ............. *A63F 13/57* (2014.09); *G06N 20/00* (2019.01)

(58) Field of Classification Search
None
See application file for complete search history.

(56) References Cited

U.S. PATENT DOCUMENTS

| 7,296,007 | B1 * | 11/2007 | Funge | ..................... | A63F 13/10 |
| | | | | | 434/350 |
| 7,636,701 | B2 * | 12/2009 | Funge | ..................... | G06N 20/00 |
| | | | | | 706/45 |
| 2020/0298128 | A1 * | 9/2020 | Yannakakis | ............ | A63F 13/67 |
| 2021/0097449 | A1 * | 4/2021 | Chattopadhyay | ...... | G06N 20/20 |

\* cited by examiner

*Primary Examiner* — Ronald Laneau
(74) *Attorney, Agent, or Firm* — Middleton Reutlinger

(57) ABSTRACT

According to a first aspect of this specification, there is disclosed a computer implemented method comprising: training, based on an initial behavior goal and using reinforcement-learning, a reinforcement-learning model for controlling behavior of a non-playable character in a computer game environment; converting the trained reinforcement-learning model into a behavior tree model for controlling behavior of the non-playable character; editing, based on a user input, the behavior tree model to generate an updated behavior tree model for controlling behavior of the non-playable character; and outputting a final model for controlling non-player character behavior for use in the computer game environment, wherein the model for controlling non-player character behavior is based at least in part on the updated behavior tree model.

17 Claims, 7 Drawing Sheets

READABLE AND EDITABLE NPC BEHAVIOR CREATION USING REINFORCEMENT LEARNING

BACKGROUND

A significant aspect of many video games is the participation of one or more computer-controlled agents—colloquially known as 'game AIs' or 'non-playable characters'—which bring about some modification in the game environment as the game is being played. These non-playable characters are controlled by models that define how they should interact with the game environment depending on the game environment's state. For example, in a game where the game world simulates real-world physics, one might find a model controlling a character figure which interacts with the game environment alongside a human player; in a strategy game, one might find a model controlling the actions of an AI opponent; or in an exploration game, a model might be used to control environmental events happening in the game world. The behavior of these computer-controlled agents is typically defined upfront by a developer and is fixed at the time of playing the game. Game developers exercise creative freedom and therefore need to be able to define the behavior of the computer-controlled agents with fine-grained precision as they see fit.

A widespread model for defining the behavior of a non-playable character is a behavior tree. A behavior tree is a graph that defines the actions that a non-playable character is to perform; the order in which they are to be performed; and how their performance can be interrupted, cancelled, re-ordered or prioritized depending on conditions observed in the game environment. When using behavior trees to create a non-playable character, developers typically need to exhaustively define every action that may be performed by the non-playable character and how the actions are linked to each other. This technique offers fine-grained control over the behavior of the non-playable character, but is also inherently time-consuming in view of the large quantity of user input required to specify the behavior. Moreover, the computational requirements for evaluating behavior trees can scale poorly with tree size, as the entire behavior tree may need to be re-evaluated at every tick of game time. Furthermore, behavior trees do not provide any mechanism for responding appropriately in situations that have not been explicitly considered in the behavior tree's specification, even when differences are only slight, instead falling back to default behaviors in such cases. As such, as game developers set out to build non-playable characters with increasingly intricate behaviors, not only does the size of the behavior trees needed to express them necessitate an inordinate quantity of user input and lead to a large consumption of computing resources at time of playing, but the behaviour trees themselves become increasingly vulnerable to errors of implementation. Thus, the current state of technology presents major barriers to developers wishing to implement complex NPC behaviors.

Separately, researchers have been using reinforcement-learning models to control adversarial sides in games such as chess and Go. In reinforcement learning, a model controlling an agent is set a training goal by a user, typically a reward to be optimized, and learns to improve itself towards this training goal through autonomous interaction with the game environment, without the developer manually needing to specify the agent's behavior. These approaches have achieved great success at learning good global strategies (e.g. strategies to win the game), requiring far less user input and having an inherent ability to react sensibly to previously-unseen situations. However, the trained models are generally difficult to interpret and modify by a human user, limiting their applicability for the creation of complex NPCs where a human designer needs to be in control of the NPC's behavior.

SUMMARY

Implementations described here relate to converting an initial reinforcement-learning model, suited to control the behavior of a non-playable character in a video game, into a behavior tree model that defines the same or a substantially identical behavior.

According to a first aspect of this specification, there is disclosed a computer implemented method comprising: training, based on an initial behavior goal and using reinforcement-learning, a reinforcement-learning model for controlling behavior of a non-playable character in a computer game environment; converting the trained reinforcement-learning model into a behavior tree model for controlling behavior of the non-playable character; editing, based on a user input, the behavior tree model to generate an updated behavior tree model for controlling behavior of the non-playable character; and outputting a final model for controlling non-player character behavior for use in the computer game environment, wherein the model for controlling non-player character behavior is based at least in part on the updated behavior tree model.

The input to the reinforcement-learning model may be game environment data (e.g., data describing the state of the game environment, which may for example include properties of a non-player character such as position or health), and the output from the reinforcement-learning model may be non-playable character behavior data (e.g. instructions) for causing a non-playable character in the computer game environment to perform one or more actions.

Converting the trained reinforcement-learning model into a behavior tree model for the behavior of the non-playable character may comprise: generating a training dataset using the trained reinforcement-learning model, the training dataset comprising examples of the behavior data output by the trained reinforcement-learning model and corresponding game environment data from which the output behavior data was generated; and training a behavior tree model using the generated training dataset.

The reinforcement-learning model may be a based on a soft decision tree. Converting the trained reinforcement-learning model into a behavior tree model for controlling the behavior of the non-playable character may comprise converting the soft decision tree to a behavior tree model.

The final model for controlling non-player character behavior may be the updated behavior tree model.

The method may further comprise: generating an updated behavior goal from the updated behavior tree model; and training an updated reinforcement-learning model for controlling behavior of the non-playable character based on the updated behavior goal using a reinforcement-learning technique. Generating an updated behavior goal from the updated behavior tree model may comprise using an inverse reinforcement-learning technique. The method may further comprise validating the updated behavior tree model in the computer game environment. Generating an updated behavior goal from the updated behavior tree model may be at least in part based on the results of validating the updated behavior tree model. The method may further comprise converting the updated reinforcement-learning model into a further behavior tree model for controlling the behavior of the non-playable character, wherein the final model for controlling the non-player character behavior is based on the further behavior tree model. Training the updated reinforcement-learning model for controlling behavior of the non-playable character may be initialized from the reinforcement-learning model. The final model for controlling non-player character behavior may be the updated reinforcement-learning model Editing, based on a user input, the behavior tree model to generate an updated behavior tree model may comprise one or more of: adding one or more nodes to the behavior tree model; deleting one or more nodes from the behavior tree model; reordering nodes in the behavior tree model; changing one or more node types in the behavior tree model; and/or altering one or more node properties of one or more nodes in the behavior tree model.

According to a further aspect of this specification, there is disclosed a computer implemented method comprising: generating, based on user input, an initial behavior tree model for controlling behavior of a non-playable character in a computer game environment; determining, based on the behavior tree model, a behavior goal for a reinforcement-learning algorithm; and training, based on the determined behavior goal and using the reinforcement-learning algorithm, a reinforcement-learning model for controlling behavior of the non-playable character in the computer game environment.

Input to the reinforcement-learning model may be game environment data and the output from the reinforcement-learning model may be non-playable character behavior data (e.g. instructions) for causing a non-playable character in the computer game environment to perform one or more actions. The input may further comprise demonstration behavior by human control data.

Determining the behavior goal from the behavior tree model may comprise using an inverse reinforcement-learning technique.

The method may further comprise validating the behavior tree model in the computer game environment, and wherein determining the behavior goal from the behavior tree model is at least in part based on the results of validating the behavior tree model.

The method may further comprise: converting the reinforcement-learning model for controlling behavior of the non-playable character into a further behavior tree model; and editing, based on a user input, the further behavior tree model to generate an updated behavior tree model for controlling behavior of the non-playable character. The method of may further comprise: determining, based on the updated behavior tree model, an updated behavior goal for the reinforcement-learning algorithm; and training, based on the updated behavior goal and using the reinforcement-learning algorithm, an updated reinforcement-learning model for controlling behavior of the non-playable character in the computer game environment. Training the updated reinforcement-learning model may be initialised from the reinforcement-learning model. The method may further comprise using the updated reinforcement-learning model to control behavior of one or more non-playable characters in a computer game environment According to a further aspect of this specification, there is disclosed apparatus comprising one or more processors and a memory, the memory comprising instructions that, when executed by the one or more processors, cause the apparatus to perform operations comprising: training, based on an initial behavior goal and using reinforcement-learning, a reinforcement-learning model for controlling behavior of a non-playable character in a computer game environment; converting the trained reinforcement-learning model into a behavior tree model for controlling behavior of the non-playable character; editing, based on a user input, the behavior tree model to generate an updated behavior tree model for controlling behavior of the non-playable character; and outputting a final model for controlling non-player character behavior for use in the computer game environment, wherein the model of non-player character behavior is based at least in part on the updated behavior tree model.

The operations may further comprise: generating an updated behavior goal from the updated behavior tree model; and training an updated reinforcement-learning model for controlling behavior of the non-playable character based on the updated behavior goal using a reinforcement-learning technique.

BRIEF DESCRIPTION OF THE DRAWINGS

Embodiments and examples will now be described by way of non-limiting examples with reference to the accompanying drawings, in which.

DETAILED DESCRIPTION

Figure 1A:
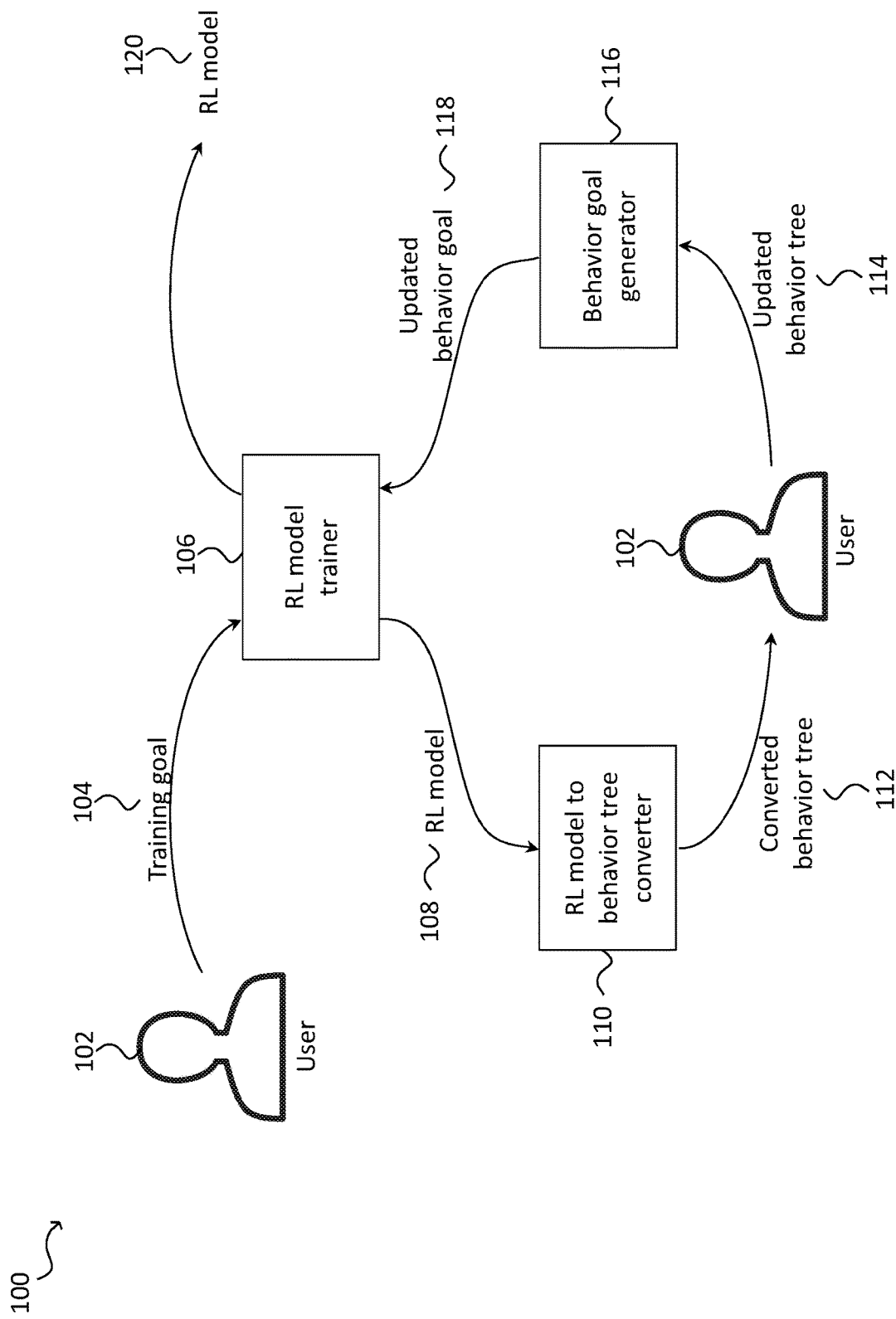
FIG. 1A shows an overview of an example method for developing a model for controlling the behavior of a non-playable character according to a desired behavior.

FIG. 1A depicts an overview of an example method 100 for developing a model capable of controlling the behavior of a non-playable character (NPC).

A user 102 (also referred to herein as a "developer") defines a training goal 104 for use by a reinforcement-learning model trainer 106 to train a reinforcement-learning model 108. The reinforcement-learning model 108 is converted 110 into a behavior tree model 112, which may then be edited manually by the user 102 to create an updated behavior tree 114. The updated behavior tree 114 may be used to control the behavior of a NPC in a game. Alternatively, the updated behavior tree 114 may be used to generate 116 an updated behavior goal 118 for the reinforcement-learning model trainer 106 to use in train an updated reinforcement-learning model 120 that accounts for the user 102 updated behaviors in the updated behavior tree 114.

In general, a game environment can be thought of as a virtual world comprising one or more objects having a simulated state, and which may each perform one or more actions. Object states in the game environment evolve according to prescribed rules depending on their previous states and actions. For example, a game environment may be a three-dimensional world that reflects some aspects of physical reality and evolves according to some physical rules. The state of an object may reflect properties intrinsic to that object, such as its position and health, or (in the case of a character) faction, or (in the case of a weapon) ammunition capacity and current loadout. In some implementations, a non-player character may be implemented as an object in a game environment that can perform actions that affect the game environment.

A game environment and the NPCs within it may be simulated by a game environment simulator. A game environment simulator simulates the passing of time in the game environment, as well as the evolution of the game environment as simulated time elapses and as agents, such as human players or NPCs, interact with it. In particular, for each instant of simulated time, a game environment simulator determines the states of the objects in the game world based on their states and actions at previous instants of simulated time. A game environment simulator may also derive further properties of objects based on the states, to be provided as inputs to agents to assist with decision-making. For example, a game environment simulator may derive, for each non-playable character, the number of enemies in sight, the number of allies in sight, etc., and provide this information to a model controlling the non-playable character. A game environment simulator may be given actions to be performed by an agent (e.g. a NPC), and have the simulated agent carry out those actions in the game environment simulation. The functionality of such a game environment simulator is typically provided by game engines, which typically load game resources such as maps, models, weapons, etc., generate a simulation of the game environment, and compute the evolution of this simulation as simulated time elapses, in a manner well-known to those skilled in the art.

To develop a model of controlling a NPC, a user 102 wishing to develop a model that controls a non-playable character according to a desired behavior may specify an initial behavior goal 104 (also referred to herein as a training goal) for training a reinforcement-learning model 108 of NPC behavior. A reinforcement-learning model trainer 106 comprised within a computer system then trains the reinforcement-learning model 108 using the initial behavior goal 104. The reinforcement-learning model 108 may be any model suitable for controlling the actions of a non-playable character in a game environment that is capable of being trained using reinforcement learning techniques. For example, the reinforcement-learning model may be any of: a policy function; an actor-critic model; or a Q-function. The reinforcement-learning model 108 may be implemented by a Long Short-term memory (LSTM) model or Gated Recurrent Unit (GRU) based artificial neural network (ANN), such as a recurrent neural network (RNN). Many other alternatives will be apparent to those skilled in the art. The behavior goal 104 may be specified in the form of a reward function for which a long-term aggregate reward is to be maximized. The input to the reinforcement-learning model 124 may be game environment data (e.g. data reflecting a state of a game environment: this may include information relating to properties of the NPC to be controlled and/or other game characters, such as, for example, their position and/or health) and the output of the reinforcement-learning model 108 is data for causing a NPC in a game environment to perform one or more actions. The reinforcement-learning model trainer 106 may train the reinforcement-learning model 108 using the behavior goal 104 by using the reinforcement-learning model 108 to control a non-playable character in a game environment over many simulated runs, evaluating how well behavior goal 104 is satisfied for each run, and updating parameters of the reinforcement-learning model 108 based on how well the behavior goal is satisfied. Additionally, or alternatively, the reinforcement-learning model trainer 106 may train the reinforcement-learning model 108 based on demonstrations generated by human users, which may be achieved using off-policy training methods such as Q-learning, for example.

In some implementations, the reinforcement-learning model 108 may be based on a soft decision tree. That is, the reinforcement-learning model 108 may be encoded as a tree of nodes, starting from a root node, where each non-leaf node (i.e. each node which has one or more child nodes) computes a score for each child node, based on the soft decision tree's inputs. Each leaf node (i.e. each node which has no child nodes) comprises one or more actions to be performed if the leaf node is selected. To select actions to be performed, the tree is traversed starting from the root node, and at each non-leaf node, the scores of the child nodes are computed based on the inputs to the soft decision tree, and one of the child nodes is selected according to a probability distribution based on the scores. This process is repeated at the child node, until a leaf node is reached, where the actions specified by the leaf node are performed. Another way to form a soft decision tree is, starting from the root node, traversing all the possible routes until the leaves are reached, and scoring every possible leaves with a probability. A final decision is sampled based on scores of the leaves. It will be appreciated that this is only one example of how the reinforcement-learning model can be converted to a behaviour tree; the behaviour tree may alternatively be trained on data generated from the reinforcement-learning model, as described below.

As an example, in the context of a shooter video game where several NPCs interact with the game world, with a player and with each other, user 102 may wish to develop a model to control the behavior of one or more of the NPCs. As a first step, user 102 may define an initial behavior goal 104 as for a character to find a way to enter a building in the game environment. This behavior goal 104 may for example be defined as a reward function that provides a reward when the character moves from a position outside the building to a position inside the building. Reinforcement-learning model trainer 106 is then used to train an artificial neural network (ANN) using reinforcement-learning with the aim of maximising the reward function. This results in a reinforcement-learning model 108 which attempts to make the character enter through a door of the building, or if that fails, through a window.

Many other examples of in-game behavior are possible, depending on the definition of the initial behavior goal 104. For example, in a first-person-shooter game, the initial behavior goal 104 may be to cause damage to a player character. In a sports game, the initial behavior goal 104 may be to score a point/goal. Many other examples are possible depending on, for example, the type of game and/or the type of NPC (e.g. hostile, friendly, part of the player team, part of an opponent etc.).

Having obtained an initial reinforcement-learning model 108 trained to the initial behavior goal 104, the initial reinforcement-learning model 108 is then converted into a behavior tree model 112 that defines the same, or approximately the same behavior, using a reinforcement-learning model to behavior tree converter 110. The trained ANN may be converted into a behavior tree model, which, if used to control the soldier character, would result in a sequence of actions that is approximately the same as that induced by the initial ANN. An example of a behavior tree is described below with reference to FIG. 3.

Any technique suitable for converting the reinforcement-learning model 108 into a behavior tree 112 may be used by the converter no. In some implementations, data relating to the behavior of an NPC controlled by the reinforcement-learning model 108 is collected in a variety of situations, and used to construct a training dataset of simulation data capturing the behavior of the reinforcement-learning model. A behavior tree model 112 is then be fitted to this data using a supervised learning algorithm. As an example, the structure of the tree, the types of the non-leaf nodes, and the actions specified by the leaf nodes may be left as variables to be determined by the supervised learning algorithm. In some implementations, actions specified by a leaf node may be defined arbitrarily by the supervised learning algorithm. In other implementations, the actions that can be performed by a leaf node may be constrained to a limited set of actions exposed by the game environment simulator. The supervised learning algorithm may alter the tree structure, non-leaf node types, and leaf node actions in order to minimize a loss reflecting the difference in behavior between reinforcement-learning model 124 and the generated behavior tree 112, using well-known supervised learning techniques. The loss may for example be defined to be the difference in certain components of the game state when using the generated behavior tree in comparison to the reinforcement-learning model 108, and may optionally incorporate regularisation terms to penalise overly complex behavior trees.

In this way, although the behavior of the reinforcement-learning model 108 may be complex, requiring a large quantity of simulation data to capture its behavior adequately, the quality of the fit can be as precise as desired; all that is needed to improve the quality of the fit is more simulation data, which can be easily obtained. Such a technique is also agnostic to the particular reinforcement-learning model 108 used.

Alternatively, if the reinforcement-learning model 108 is based on a soft decision tree, the soft decision tree may be directly converted into a behavior tree 112, by replacing each non-leaf node of the soft decision tree with "Selector" and "Condition" behavior tree nodes which approximate the decisions made by each non-leaf node of the soft decision tree.

A behavior tree 112 describes the behavior of an agent in a manner that is understandable by humans. Converting the reinforcement-learning model 108 to a behavior tree 112 allows a user 102 to gain understanding of how the initial reinforcement-learning model 108 determines which action to instruct the NPC to perform. As a result of this insight, user 102 may find that the reinforcement-learning model 108 behavior does not correspond to their expectations, for example producing unrealistic behaviors, and may desire to alter it. Returning to the example of an NPC entering a building, the game developer, upon examining the generated behavior tree, may notice that the character attempts to enter the building through a roof if its attempt to enter through a door fails, when this is in fact inappropriate for considerations of gameplay or realism. In the example of a first-person shooter, the NPC may attempt to attack the player character without regard to its own in-game survival. In the example of a sports game, the NPC may attempt to score points/goals without preventing the player/player team from scoring points against them. Many other examples of unwanted NPC behavior are possible, depending on in-game context.

In view of this, user 102 may be provided with means to visualise the generated behavior tree 112, such that user 102 can understand the behavior of reinforcement-learning model 108. In this manner, user 102 can be given the ability to make an informed decision to validate or reject the reinforcement-learning model 108. If the user 102 validates reinforcement-learning model 108, the reinforcement-learning model 108 may then be used as the controller for the NPC in production deployments of the game environment. In this way, the NPC can benefit from the robustness to variations in environment and computational efficiency that flow from using reinforcement-learning model 108, without sacrificing the assurance that the NPC will behave as expected.

Moreover, in some implementations, the user 102 may be provided with means to edit the generated behavior tree 112, resulting in an updated behavior tree 114. In particular, the system performing the method may receive, from a user 102, an indication of one or more edits of the behavior tree 112. The edits may involve one or more of adding, deleting or re-ordering nodes of the behavior tree and/or altering the function performed by a node. In the example of a NPC entering a building, the user may edit the generated behavior tree 112 to delete all nodes pertaining to entering the building through a window, and to adjust a control node to try to enter the building through a different door if the first door cannot be entered through. In the examples of a first-person shooter and sports game, the user 102 may delete nodes associated with overly reckless NPC behavior. Many other examples of nodes that may be deleted are possible, depending on the desired behavior of the NPC.

In some implementations, at this stage the updated behavior tree may be validated by using it to control a NPC in a game environment, and the results validated by the user. This allows the user 102 to check if the updated behavior tree 114 provides the desired NPC behavior. In implementations where a further reinforcement-learning model 120 is trained based on the updated behavior tree 114, validating the effects of modifying the updated behavior tree 114 before incurring the computational costs of generating an updated behavior goal 116 and training an updated reinforcement-learning model 120 can prevent the training of an updated reinforcement-learning model with unrealistic behavior.

A final model for controlling non-playable character behavior may then be output, based on updated behavior tree 114. This final model may reflect the changes to NPC behavior that are reflected in the edits to the behavior tree 112.

Since training a reinforcement-learning model 108 does not require manual definition of all relevant behaviors, unlike the manual specification of the behavior of a NPC in a behavior tree, the above process may have the benefits of drastically reducing the quantity of user input required to obtain a model for controlling non-playable character behavior, while nevertheless providing game developers with the flexibility to inspect and adapt the resulting model. The use of reinforcement-learning may also uncover additional potential behaviors for NPCs that may not have been considered by a developer when designing a behavior tree.

In some implementations, the final model for NPC behavior output by the method may be the updated behavior tree 114.

In other implementations, the updated behavior tree 114 may be further processed using a behavior goal generator 116 to obtain an updated behavior goal 118 for training a further reinforcement-learning model 120. This may be achieved using an inverse-reinforcement-learning technique. In particular, if reinforcement-learning model 108 had been initially trained to maximize a certain reward function, an updated reward function may be generated from updated behavior tree 114. The updated behavior goal may reflect the priorities indicated by the updated behavior tree 114 itself and/or by the changes made by the user to the behavior tree 112. Besides being based on updated behavior tree 114, updated behavior goal 118 may also be based on initial behavior goal 104 and behavior tree 112 converted from the initial reinforcement-learning model. Continuing the example of a NPC entering a building, if the initial reward function 104 used to train the RNN rewarded the character for being inside the building, an updated reward function 118 may reward the NPC for being inside the building while penalising the NPC for opening or smashing windows.

An updated reinforcement-learning model 120 is then trained using the updated behavior goal 118. In particular, if updated behavior goal 118 is a reward function, an updated reinforcement-learning model 120 may be trained using reinforcement-learning 106 with the goal of optimising (i.e. maximising or minimising, depending on the form of the function) the reward function. For example, if the reward function rewards the character for being inside the building and penalises the character for opening or smashing windows, a new reinforcement-learning model 120 may be trained with the goal of maximising this reward function. This will result in an updated reinforcement-learning model 120 for controlling the character to enter buildings, but not through windows. In the example of a first-person shooter, the updated behavior goal 118 may contain one or more terms that reward NPC survival in addition to the terms rewarding damage to the player character. In the example of a sports game, the updated behavior goal 118 may contain one or more terms that reward not conceding points/goals. Many other examples of unwanted NPC behavior are possible, depending on edits made to the behavior tree by the user 102.

The method too can drastically reduce the quantity of user input required to obtain a model for controlling NPC behavior by leveraging the capabilities of reinforcement-learning, while nevertheless providing game developers with the flexibility to inspect and adapt the resulting model. Furthermore, for very complex behaviors, the resulting reinforcement-learning model 120 may also be more computationally efficient to evaluate during game run-time than an equivalent behavior tree 114 defining a behavior with the same level of complexity. Some reinforcement-learning models, such as recurrent neural network architectures, are capable of hardware acceleration using typical gaming hardware such as graphics processing units (GPUs) or tensor processing units (TPUs), whereas behavior trees typically are not. As game developers seek to create agents with ever-increasing intricacies of behavior, the ability to express such behaviors in the form of reinforcement-learning models may lead to improved computational efficiency, and the lifting of computational limitations to enable previously un-implementable behaviors to be implemented.

In some implementations, the step of training an updated reinforcement-learning model 120 using the updated behavior goal 118 may be performed on a model already trained to the initial behavior goal, such as initial reinforcement-learning model 108, rather than on a model with randomly-initialized weights. This may reduce the amount of training needed to reach the updated behavior goal. Furthermore, due to the increased complexity of the updated behavior goal, starting from initial reinforcement-learning model 108 may enable the training to refine the behavior of the initial reinforcement-learning model incrementally, whereas training a model initialized with random weights to the updated behavior goal might lead to completely different behavior. Additionally, such an incremental approach can mitigate the issues of using inverse reinforcement learning to infer an updated behavior goal from the updated behavior tree. In particular, by further training the initial reinforcement-learning model rather than training a new network to the updated behavior goal, the reinforcement-learning model can simply be tweaked in the direction desired by the developer. In some implementations, the developer may even be given control to stop the further training as desired, before it has fully converged, thus allowing the developer to decide when the model has absorbed enough of the updated behavior goal. In this manner, the developer may be provided with the power to craft NPCs with a subtle mix of behaviors.

In this way, the user may iteratively refine the behavior of the reinforcement-learning model, starting from a broadly set initial behavior goal and making iterative edits to the converted behavior tree resulting in increasingly intricate definitions of the behavior goal, while training the reinforcement-learning model on the updated behavior goal at each iteration. Beneficially, this may provide the user with a reinforcement-learning model whose behavior is precisely controlled yet does not need to be specified entirely by user input—rather, the user only provides feedback regarding aspects of the behavior that need to change—thereby leading to greatly increased efficiency in human-computer interaction. Additionally, such an iterative process may successfully produce a reinforcement-learning model that would not be otherwise attainable. For example, if the final behavior goal were so complex that attempting to train a randomly-initialized model would not lead to convergence.

The updated reinforcement-learning model 120 and/or behavior tree 114 are output for use in controlling the behavior of one or more NPCs in a computer game. The AI of one or more in-game characters may be controlled by one or more of the models developed using the methods described herein.

Figure 1B:
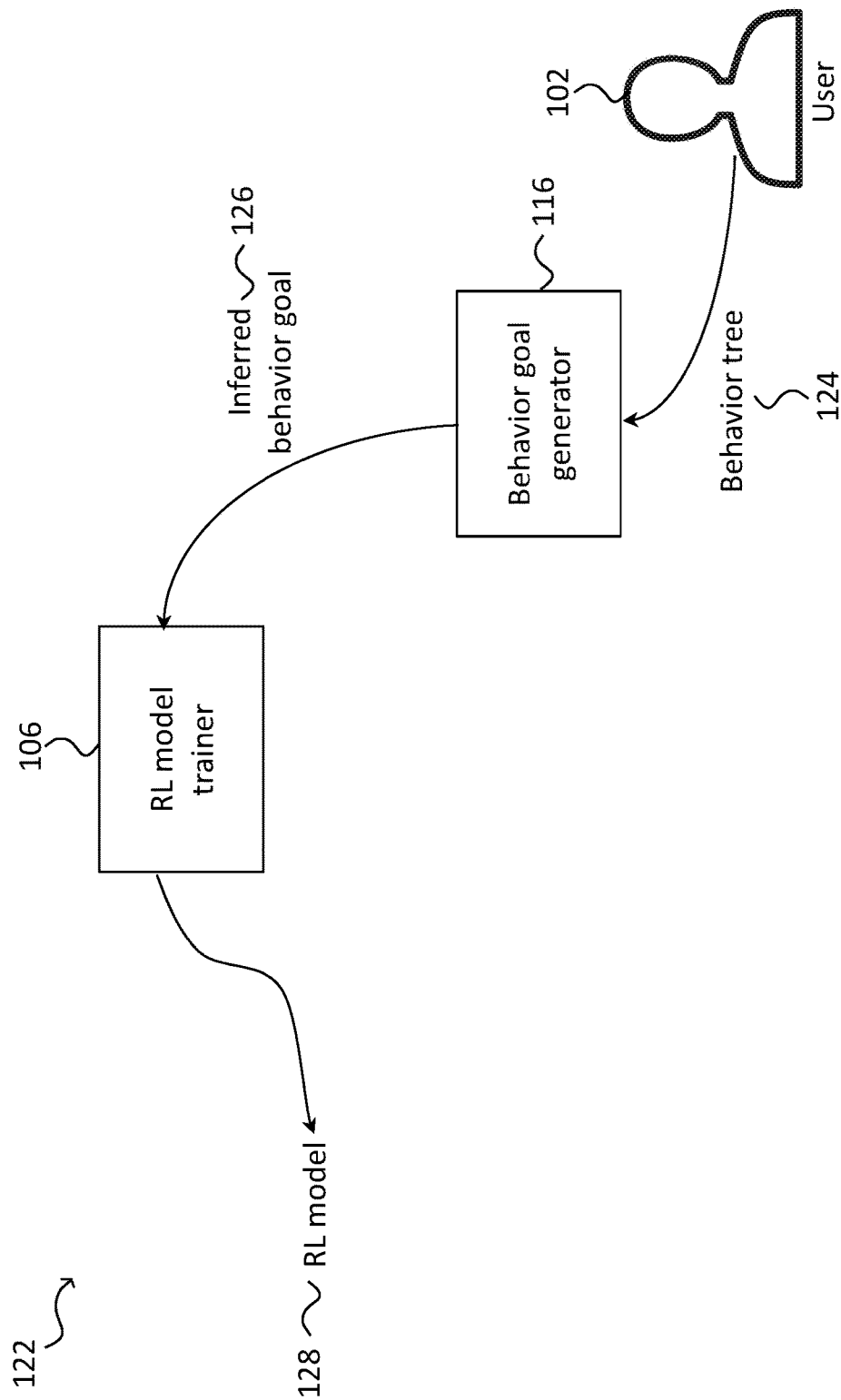
FIG. 1B shows an overview of an example method for developing a model for controlling the behavior of a non-playable character according to a desired behavior.

FIG. 1B depicts an overview of a further example method 122 for developing a model suitable for controlling the behavior of a NPC in a computer game. In this example, a computer system obtains an initial behavior tree 124 from a user 102. This behavior tree 124 may be based on a behavior tree converted from an initial reinforcement-learning model, as in the example of FIG. 1A, but may alternatively be created by the user 102 manually.

A behavior goal generator 116 is used to generate a behavior goal 126 from the initial behavior tree 124. A reinforcement-learning model trainer 106 is used to train a reinforcement-learning model 128 using the generated behavior goal 126, in a manner similar to that described with reference to FIG. 1A.

Figure 2:
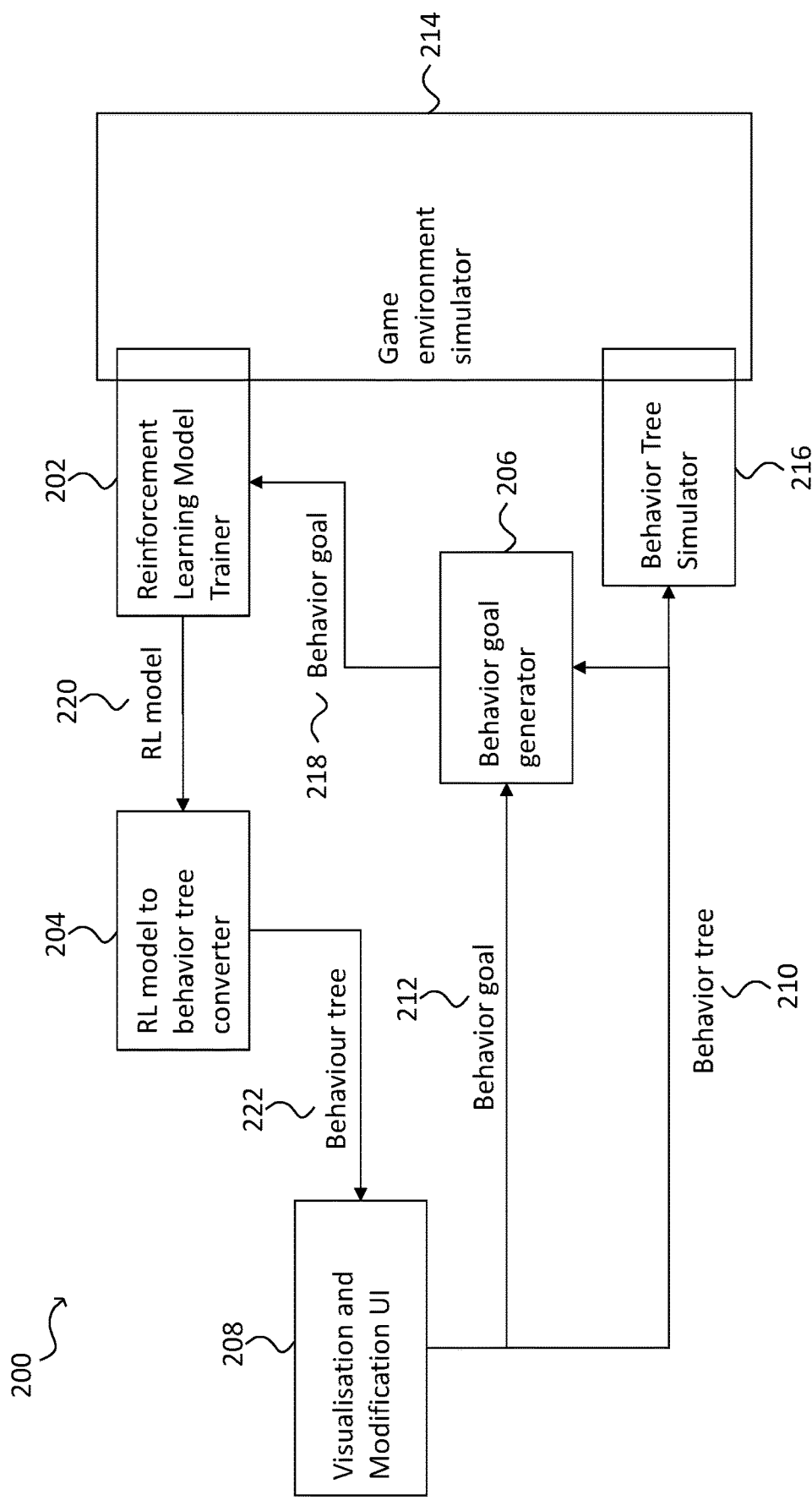
FIG. 2 shows an overview of further example method for developing a model for controlling the behavior of a non-playable character in a game.

In this manner, a reinforcement-learning model 128 may be constructed which reflects the behavior of an initially-specified behavior tree model 124. This enables the conversion of existing game AI projects constructed using behavior trees into reinforcement-learning models, bringing the computational advantages of reinforcement-learning models which have been outlined above, and enabling the project to leverage the user input efficiency of reinforcement learning through the steps outlined above as it continues to be developed. As shown in FIG. 2, the techniques described with reference to FIGS. 1A and 1B can be combined and applied iteratively. FIG. 2 depicts a schematic example of a system 200 for developing a model for controlling NPC behavior in a computer game. The system 200 comprises a reinforcement-learning model trainer 202, a reinforcement-learning model to behavior tree converter 204 and a behavior goal generator 206 akin to those described with reference to FIG. 1A. Computer system 200 also comprises a visualisation and modification UI 208 which allows a user to visualize and modify a behavior tree 210 and/or a behavior goal 212, a game environment simulator 214, and a behavior tree simulator 216 for controlling a non-player character in a game environment simulation 214 according to a given behavior tree 210.

Using visualisation and modification UI 208, a user may start by defining initial behavior data for a non-player character. The initial behavior data may be in the form of a behavior tree 210 manually constructed by the user. Alternatively, the user may manually define a behavior goal 212 for a reinforcement-learning algorithm.

Using the initial behavior data, the system 200 obtains a behavior goal 218 to be used to train a reinforcement-learning model, using behavior goal generator 206. For example, behavior goal generator 206 may use inverse reinforcement learning to generate a behavior goal 218 that reflects the priorities indicated by behavior tree 210, as described above in relation to FIGS. 1A and 1B. Alternatively, in some implementations the behavior goal 218 may be identical to the initial behavior goal 212 defined by the user.

In some implementations, the behavior tree 210 may be validated by the user using a behavior tree simulator 216. The behavior tree simulator 216 simulates the use of the behavior tree 210 by an NPC in the game environment 214.

The system 200 then trains a reinforcement-learning model 220 based on behavior goal 218 using reinforcement-learning model trainer 202. The reinforcement-learning model 220 may then be converted into a further behavior tree 222 using reinforcement-learning model to behavior tree converter 204. The behavior tree converter 204 may apply any of the methods described in relation to FIG. 1A for converting the reinforcement-learning model 220 into the further behavior tree 222.

The further behavior tree 222 may then be examined and/or modified by a user using the visualisation and modification UI 208. The user may update the further behavior tree 222 to generate an updated behavior tree. The process may be repeated as desired. One or more of the behavior trees 210, 222 and/or one or more of the reinforcement-learning models 220 thus obtained may be output for controlling a non-playable character in a computer game.

Such a technique may provide improved control to the user over the behavior of the output model; reduced user interaction required to specify this behavior; improved robustness; and reduced computational complexity of the output model, as already discussed with reference to FIGS. 1A and 1B.

Figure 3:
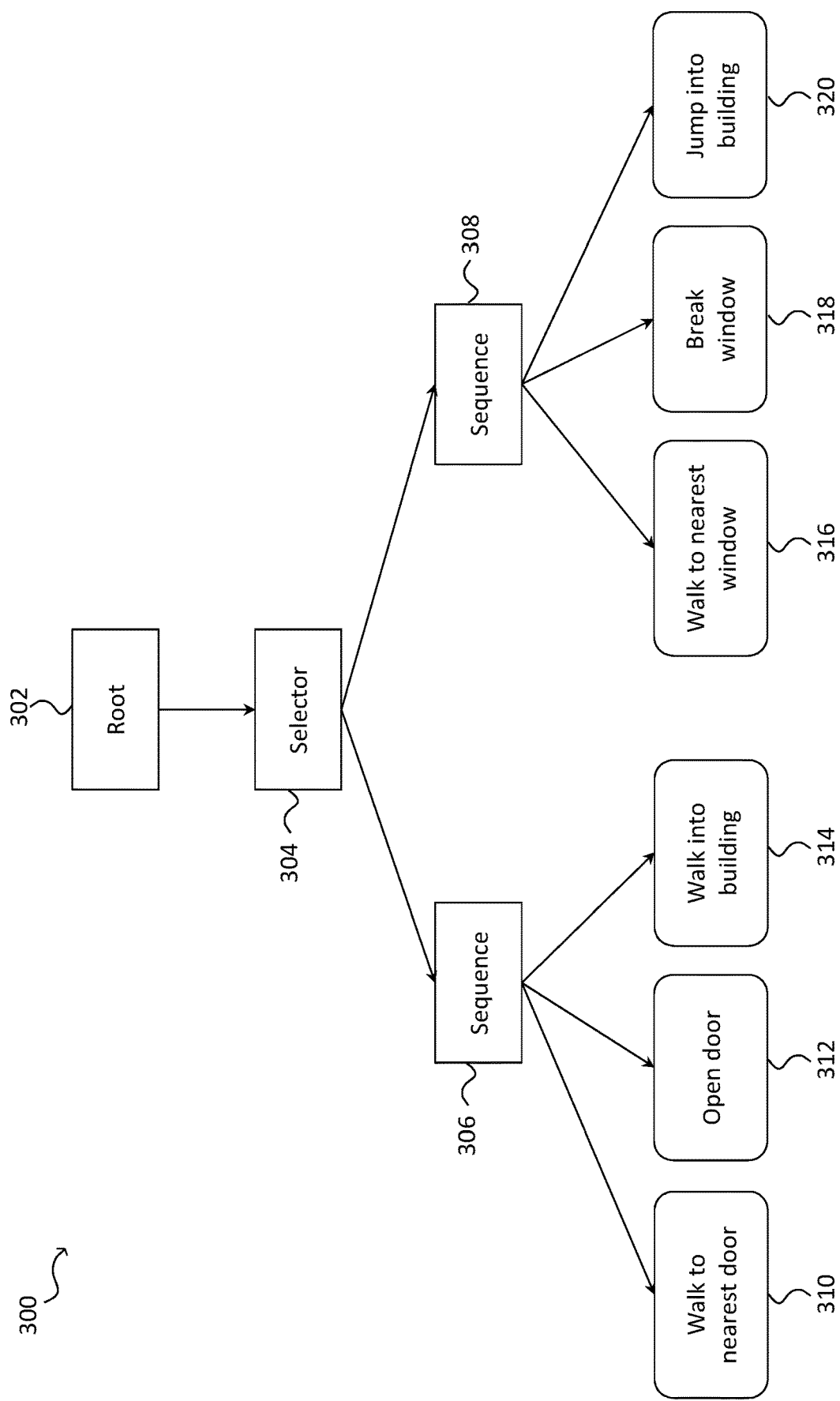
FIG. 3 shows an example of a behavior tree for controlling the behavior of an NPC in a computer game.

FIG. 3 shows an example of behavior tree 300 for controlling the behavior of an NPC in a computer game. A behavior tree 300 may be thought of as a set of nodes linked to each other in a tree structure, starting from a root node 302, such that each node (except the root node) has exactly one parent node. Nodes that have no child nodes are called leaf nodes 310-320; nodes that do are called non-leaf nodes 304-308. Each leaf node 310-320 specifies an action, or a series of actions, to be performed by the non-playable character in a computer game environment, such as "go to position X". Each non-leaf node defines logic that influences the execution of its one or more child nodes, such as a "Sequence" node 306, 308, which executes all its child nodes in sequential order until they all succeed or one fails, a "Selector" node 304, which executes its child nodes in sequential order until one succeeds, a "Parallel" node (not shown), which executes its child nodes in parallel until one finishes, or a "Condition" node (not shown), which executes its child node if a particular pre-defined condition is satisfied.

At each instant of simulated time within a computer game, each leaf node 310-320 may have either the status "running", in which case the action(s) specified by the node are performed by the non-playable character in the game environment, or "not running", in which case its actions are not performed. To execute a behavior tree 300, an interpreter, starting from the root node 302, traverses down the tree according to the logic specified by the non-leaf nodes 304-308, until the interpreter arrives at one or more leaf nodes 310-320, which are then selected as "running". While a leaf node is running, the interpreter communicates the action specified by the leaf node (e.g. "go to position X") to the game environment simulator, to be performed by the non-player character. A leaf node may run for several instants of game time, until its action is complete or fails. When the action specified by a running leaf node is complete or fails (e.g., if the non-playable character has arrived at position X or is unable to reach position X), an indication of success or failure is passed to its parent node. Depending on the logic specified by the parent node, the interpreter may then pass control to another one of its child nodes (which, if it is a leaf node, will be made to run), or pass success or failure back up to its parent node, where the same process is repeated, until a new leaf node is given the "running" status.

To illustrate this, FIG. 3 depicts an example behavior tree 300 for controlling the behavior of an NPC in a game that may be obtained by converting a reinforcement-learning model into a behavior tree using one or more of the aforementioned techniques. Behavior tree 300 may result from the conversion of a reinforcement-learning model which attempts to make a NPC in a computer game enter a building by first attempting to enter through a door, and if this fails, attempting to enter through a window. This behavior tree 300 may be obtained by fitting a behavior tree model to a training dataset capturing the behavior of the reinforcement-learning model using supervised learning, as described above in relation to FIG. 1A. The resulting behavior tree 300 may first of all comprise a "Selector" node 304 directly under root node 302. Selector node 304 executes its child nodes in order until one returns success. Behavior tree 300 may further comprise two "Sequence" nodes 306, 308 under "Selector" node 304, which execute their child nodes in order until one of them fails or all succeed, and return failure or success respectively if one of their child nodes fails or all their child nodes succeed. Here, the sub-tree starting with "Sequence" node 306 represents attempting to enter the building through a door. "Sequence" node 306 may have three leaf nodes 310-314 as its children: leaf node 310 which attempts to move the NPC to the nearest door; leaf node 312 which attempts to open the door; and leaf node 314 which attempts to enter the building. The actions specified by leaf nodes 310-314 may for example be actions exposed by the game simulator, and may have been selected by e.g. a supervised learning algorithm that fitted behavior tree 300 to the reinforcement-learning model, as described above. The sub-tree starting with "Sequence" node 308 may also have three leaf nodes 316-320 as its children: leaf node 316 which attempts to move the NPC to the nearest window; leaf node 318 which attempts to break the window open; and leaf node 320 which attempts to jump inside the building through the window. Those skilled in the art will recognise that this is an illustrative example and that slightly different behavior trees could equally well be generated by converting the reinforcement-learning model into a behavior tree.

Figure 4:
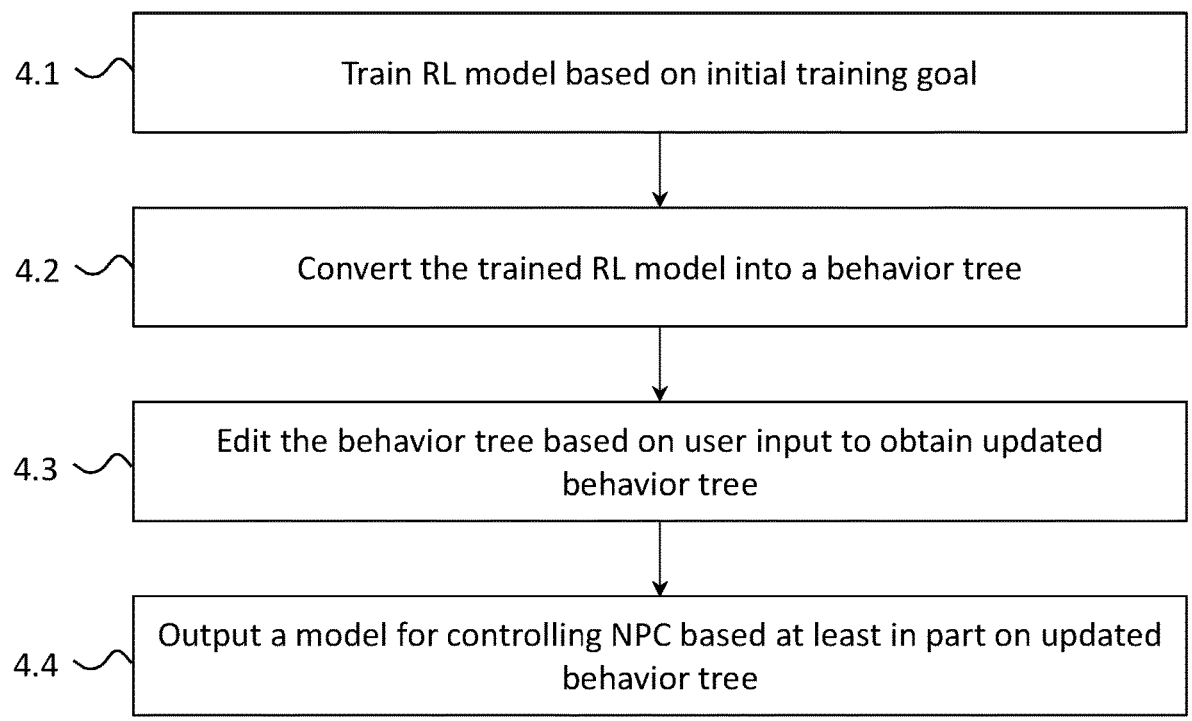
FIG. 4 shows a flow chart of an example method for developing a model suitable for controlling the behavior of a non-playable character.

FIG. 4 shows a flow chart of an example method for developing a model for controlling the behavior of a non-playable character.

At operation 4.1, a reinforcement-learning model for controlling behavior of a non-playable character in a computer game environment is trained using reinforcement-learning, based on an initial behavior goal.

The reinforcement-learning model can be any model suitable to be trained using reinforcement-learning (e.g. a LSTM- or GRU-based RNN), and is suitable for controlling the behavior of a non-player character by determining actions to be taken by a NPC. In certain embodiments, this may be achieved by a reinforcement-learning model that takes game environment data as input (e.g., data reflecting a state of a game environment) and outputs non-playable character behavior data for causing a non-playable character in the computer game environment to perform one or more actions. Such non-playable character behavior data may directly specify actions (e.g., a list of actions to be performed/instructions for causing actions to be performed), or may indirectly determine one or more actions to be performed. For example, the reinforcement-learning model may be a policy function, that outputs a set of probabilities from which an action can be sampled; an actor-critic model, where the actor function outputs a set of probabilities from which an action can be sampled; or a Q-function, which outputs estimated returns for each possible action from which an action to be taken can be determined; among many alternatives known to those skilled in the art. The reinforcement-learning model can be trained using any reinforcement-learning technique adapted to the particular model used e.g. a policy-gradient technique if the model is based on a policy function, or Q-learning if the model is based on a Q-function.

At operation 4.2, the trained reinforcement-learning model is converted into a behavior tree model for controlling behavior of the NPC. In some implementations, this may be achieved by generating a training dataset using the trained reinforcement-learning model, where the training dataset comprises examples of the behavior data output by the trained reinforcement-learning model and corresponding game environment data from which the output behavior data was generated. The training dataset can be used to train a behavior tree model using supervised learning techniques. For example, the trained reinforcement-learning model may be used to control a non-playable character in a game environment, and the state of the game environment and the actions performed may be sampled at several instants of game time to form the training dataset. A generic behavior tree model—one where the tree structure and node types can be altered—can then be trained using supervised learning by adding, altering and/or removing tree nodes until the actions induced by the behavior tree are sufficiently close to those induced by the trained reinforcement-learning model on the training dataset.

In other implementations, the trained reinforcement-learning model may be based on a soft decision tree, and this soft decision tree may be directly converted to a behavior tree model. A soft decision tree is a tree of nodes, where each leaf node specifies one or more actions to be performed if this leaf node is selected, and each non-leaf node determines the probability of selecting each of its child nodes based on the inputs to the soft decision tree. To convert the soft decision tree to a behavior tree model, each non-leaf node of the soft decision tree may be converted into one or more behavior tree nodes, which approximate the decision criterion of the soft decision tree node.

At operation 4.3, the behavior tree model may be edited based on user input to generate an updated behavior tree model for controlling behavior of the NPC. For example, a graphical user interface representing the behavior tree model may be presented to the user, in which the user can add, alter and/or remove nodes of the behavior tree model, thus resulting in an updated behavior tree. The user may validate the updated behavior tree by using it to control the behavior of a NPC in a game environment. Based on the results of the validation the user may decide whether the updated behavior tree is fit for controlling the behavior of the NPC, in which case they may decide to proceed with the method, or not, in which case the user may further edit the updated behavior tree.

At operation 4.4, a final model for controlling non-player character behavior for use in the computer game environment may be output. The final model is based at least in part on the updated behavior tree model.

In some implementations, the updated behavior tree model may simply be output as the final model; the updated behavior tree model may then be used to control a non-playable character in a game environment.

In other implementations, the updated behavior tree model may be used to generate an updated behavior goal; and an updated reinforcement-learning model for controlling behavior of the non-playable character may be trained based on the updated behavior goal using a reinforcement-learning technique. For example, an inverse reinforcement-learning technique may be used to generate an updated behavior goal from the updated behavior tree model. In other words, an inverse reinforcement-learning technique may be used to infer a behavior goal (e.g., a reward function) implied by the updated behavior tree model. This inference may be based not only on the updated behavior tree model, but also on the behavior tree model converted from the initial reinforcement-learning model and also on the initial behavior goal.

The updated reinforcement-learning model may be trained from a random initialisation. Alternatively, the updated reinforcement-learning model may be initialized as the initial reinforcement-learning model.

The updated reinforcement-learning model may be output as the final model. Alternatively, operations 4.2 to 4.4 may be iterated, i.e. the updated reinforcement-learning model may be converted into a further behavior tree model for controlling the behavior of the NPC and the behavior tree model may be updated/edited by a user.

Figure 5:
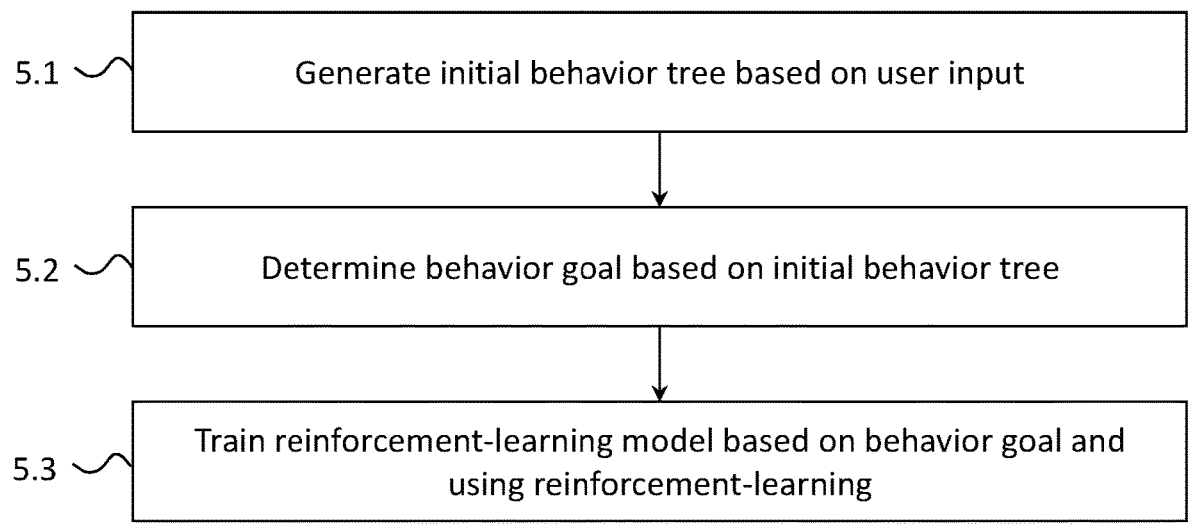
FIG. 5 shows a flow chart of a further example method for developing a model suitable for controlling the behavior of a non-playable character.

FIG. 5 shows a further example method for developing a model suitable for controlling the behavior of a NPC in a computer game. At operation 5.1, an initial behavior tree model for controlling behavior of a NPC in a computer game environment is generated based on user input. For example, a user may graphically construct a behavior tree by assembling nodes in a graphical behavior tree editor. This behavior tree may be validated in the game environment, for example by controlling a non-playable character according to the behavior tree and inspecting the resulting behavior, and the subsequent steps performed if the behavior tree is validated.

At operation 5.2, a behavior goal for a reinforcement-learning algorithm may be determined based on the behavior tree model. For example, using an inverse reinforcement-learning technique, a behavior goal that the behavior tree model attempts to fulfil may be inferred.

At operation 5.3, a reinforcement-learning model for controlling behavior of the NPC in the computer game environment is trained, based on the determined behavior goal and using the reinforcement-learning algorithm. The reinforcement-learning model may be any model that can be trained using reinforcement learning, such as a LSTM- or GRU-based ANN, as described above, and can take as input game environment data and output non-playable character behavior data for causing a non-playable character to perform one or more actions. The training can be performed using any appropriate technique e.g. policy gradient if the model is based on a policy function or Q-learning if the model is based on a Q-function.

In some implementations, the trained reinforcement-learning model can be converted into a behavior tree (e.g., using the techniques described above), and the behavior tree edited. An updated behavior goal may then be determined from the updated behavior tree (e.g., inferred using inverse reinforcement-learning), and an updated reinforcement-learning model may be trained based on the updated behavior goal using reinforcement-learning. In this manner, a reinforcement-learning model for controlling a non-playable character may be iteratively refined, according to a user's editing of the corresponding behavior tree.

Figure 6:
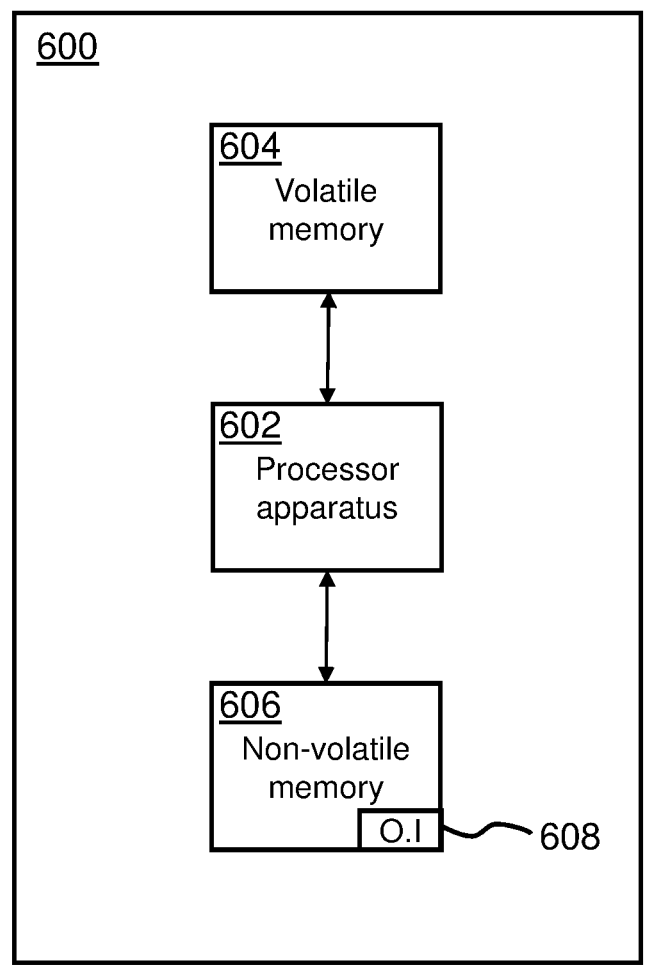
FIG. 6 shows an example of a system/apparatus suitable for performing any of the methods disclosed herein.

FIG. 6 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 600 comprises one or more processors 602. The one or more processors control operation of other components of the system/apparatus 600. The one or more processors 602 may, for example, comprise a general-purpose processor. The one or more processors 602 may be a single core device or a multiple core device. The one or more processors 602 may comprise a Central Processing Unit (CPU) or a graphical processing unit (GPU). Alternatively, the one or more processors 602 may comprise specialized processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example, Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to store temporarily data generated during execution of said operating instructions 608.

Implementations of the methods described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Any system feature, as described herein, may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims and their equivalents.

The invention claimed is:

1. A computer implemented method comprising:
   training, by one or more processors and based on an initial behavior goal and using reinforcement-learning, a reinforcement-learning model for controlling behavior of a non-playable character in a computer game environment, wherein input to the reinforcement-learning model comprises game environment data and output from the reinforcement-learning model is non-playable character behavior data for causing the non-playable character in the computer game environment to perform one or more actions;
   converting, by the one or more processors, the trained reinforcement-learning model into a behavior tree model for controlling behavior of the non-playable character;
   editing, by the one or more processors and based on a user input, the behavior tree model to generate an updated behavior tree model for controlling behavior of the non-playable character; and
   outputting, by the one or more processors, a final model for controlling non-player character behavior for use in the computer game environment, wherein the final model for controlling non-player character behavior is based at least in part on the updated behavior tree model, and wherein input to the final model for controlling non-player character behavior comprises game environment data and output from the final model for controlling non-player character behavior is non-playable character behavior data for causing the non-playable character in the computer game environment to perform the one or more actions.

2. The method of claim 1, wherein converting the trained reinforcement-learning model into the behavior tree model for the behavior of the non-playable character comprises:

generating a training dataset using the trained reinforcement-learning model, the training dataset comprising examples of the behavior data output by the trained reinforcement-learning model and corresponding game environment data from which the behavior data output was generated; and training the behavior tree model using the generated training dataset.

3. The method of claim 1, wherein the reinforcement-learning model is a based on a soft decision tree, and wherein converting the trained reinforcement-learning model into the behavior tree model for controlling the behavior of the non-playable character comprises converting the soft decision tree to the behavior tree model.

4. The method of claim 1, wherein the final model for controlling non-player character behavior is the updated behavior tree model.

5. The method of claim 1, further comprising:
generating an updated behavior goal from the updated behavior tree model; and
training an updated reinforcement-learning model for controlling behavior of the non-playable character based on the updated behavior goal using a reinforcement-learning technique.

6. The method of claim 5, wherein generating the updated behavior goal from the updated behavior tree model comprises using an inverse reinforcement-learning technique.

7. The method of claim 5, further comprising validating the updated behavior tree model in the computer game environment, and wherein generating the updated behavior goal from the updated behavior tree model is at least in part based on the results of validating the updated behavior tree model.

8. The method of claim 5, further comprising converting the updated reinforcement learning-model into a further behavior tree model for controlling the behavior of the non-playable character, wherein the final model for controlling the non-player character behavior is based on the further behavior tree model.

9. The method of claim 5, wherein the final model for controlling the non-player character is the updated reinforcement-learning model.

10. The method of claim 1, wherein editing, based on the user input, the behavior tree model to generate the updated behavior tree model comprises one or more of: adding one or more nodes to the behavior tree model; deleting one or more nodes from the behavior tree model; reordering nodes in the behavior tree model; changing one or more node types in the behavior tree model; and/or altering one or more node properties of one or more nodes in the behavior tree model.

11. A computer implemented method comprising:
generating, by one or more processors and based on user input, an initial behavior tree model for controlling behavior of a non-playable character in a computer game environment, wherein input to a behavior tree model is game environment data and output from the behavior tree model is non-playable character behavior data for causing the non-playable character in the computer game environment to perform one or more actions;
determining, by the one or more processors and based on the behavior tree model, a behavior goal for a reinforcement-learning algorithm using an inverse reinforcement-learning technique; and
training, by the one or more processors and based on the determined behavior goal and using the reinforcement-learning algorithm, a reinforcement-learning model for controlling behavior of the non-playable character in the computer game environment wherein input to the reinforcement-learning model is the game environment data and output from the reinforcement-learning model is the non-playable character behavior data for causing the non-playable character in the computer game environment to perform the one or more actions.

12. The method of claim 11, further comprising validating the behavior tree model in the computer game environment, and wherein determining the behavior goal from the behavior tree model is at least in part based on the results of validating the behavior tree model.

13. The method of claim 11, further comprising:
converting the reinforcement-learning model for controlling behavior of the non-playable character into a further behavior tree model; and
editing, based on the user input, the further behavior tree model to generate an updated behavior tree model for controlling behavior of the non-playable character.

14. The method of claim 13, further comprising:
determining, based on the updated behavior tree model, an updated behavior goal for the reinforcement-learning algorithm; and
training, based on the updated behavior goal and using the reinforcement-learning algorithm, an updated reinforcement-learning model for controlling behavior of the non-playable character in the computer game environment.

15. The method of claim 14, further comprising using the updated reinforcement-learning model to control behavior of one or more non-playable characters in the computer game environment.

16. Apparatus comprising one or more processors and a memory, the memory comprising instructions that, when executed by the one or more processors, cause the apparatus to perform operations comprising:
training, by the one or more processors and based on an initial behavior goal and using reinforcement-learning, a reinforcement-learning model for controlling behavior of a non-playable character in a computer game environment, wherein input to the reinforcement-learning model is game environment data and output from the reinforcement-learning model is non-playable character behavior data for causing the non-playable character in the computer game environment to perform one or more actions;
converting, by the one or more processors, the trained reinforcement-learning model into a behavior tree model for controlling behavior of the non-playable character;
editing, by the one or more processors and based on a user input, the behavior tree model to generate an updated behavior tree model for controlling behavior of the non-playable character; and
outputting a final model for controlling non-player character behavior for use in the computer game environment, wherein the model of non-player character behavior is based at least in part on the updated behavior tree model, and wherein input to the final model for controlling non-player character behavior is game environment data and output from the final model for controlling non-player character behavior is non-playable character behavior data for causing the non-playable character in the computer game environment to perform the one or more actions.

17. The apparatus of claim 16, wherein the operations further comprise:

generating an updated behavior goal from the updated behavior tree model; and training an updated reinforcement-learning model for controlling behavior of the non-playable character based on the updated behavior goal using a reinforcement-learning technique.

* * * * *